United States Patent [19]
Carrico

[11] 3,956,938
[45] May 18, 1976

[54] PRESSURE SENSORS UTILIZING FERROMAGNETIC FLUIDS

[75] Inventor: John Paul Carrico, Royal Oak, Mich.

[73] Assignee: The Bendix Corporation, Southfield, Mich.

[22] Filed: Mar. 20, 1975

[21] Appl. No.: 560,057

[52] U.S. Cl. .............................. 73/398 R; 73/395; 73/406
[51] Int. Cl.² .......................................... G01L 9/10
[58] Field of Search ................. 73/398 R, 395, 301, 73/401, 406, 104, 105; 336/30

[56] References Cited
UNITED STATES PATENTS
3,536,932  10/1970  Humbert-Droz..................... 336/30

Primary Examiner—Donald O. Woodiel
Attorney, Agent, or Firm—William F. Thornton; Lester L. Hallacher

[57] ABSTRACT

The invention is directed to the measurement of pressure and pressure differentials utilizing ferromagnetic fluids. The inventive devices include a ferromagnetic fluid physically arranged to be subjected to the pressure being monitored. Changes in the monitored pressure cause physical displacement of the ferromagnetic fluid. The displacements are detected by utilizing the magnetic characteristics of the ferromagnetic fluids to generate useful output signals.

7 Claims, 4 Drawing Figures

PRESSURE SENSORS UTILIZING FERROMAGNETIC FLUIDS

BACKGROUND OF THE INVENTION

Pressure gauges frequently include a metal diaphragm, which is exposed to the pressure being sensed so that the deflection of the diaphragm is representative of the sensed pressure. Mechanical linkages or strain gauges are responsive to the diaphragm deflection and are used to actuate the visual output device from which the sensed pressure is read. Such pressure sensors suffer inherent disadvantages for example, the mechanical linkages or strain gauges introduce serious errors into measurement because of the difficulty occasioned in proportionately translating the deflection of the diaphragm into the visual output. Problems also arise because the linkage necessarily has inertia, friction and temperature characteristics which contribute to the inability to accurately translate the physical deflection of the diaphragm into a visual output. Problems also arise because materials used to attach the strain gauge to the diaphragm introduce mechanical instability and temperature effects. Another source of error arises from the inherent characteristics of the materials from which the diaphragm is fabricated. Relatively large deflections experienced by the diaphragm introduce large strains which are responsible for hysteresis and nonreproducibility of the measurement.

SUMMARY OF THE INVENTION

The invention eliminates the aforementioned problems by eliminating the diaphragm characteristics which cause problems and the mechanical linkages or strain gauges which ordinarily are responsive to the diaphragm. In the invention a ferromagnetic fluid is subjected to the pressure to be measured and the motion of the ferromagnetic fluid in response to the pressure changes results in the generation of an electrical signal which is detected and utilized as being representative of the applied pressure. Because the fluid is subjected to the pressure, the heavy metallic type of pressure diaphragm is eliminated, thereby eliminating the inherent hysteresis and nonreproducibility problems associated with such diaphragms. Also, because the mechanical linkage is eliminated the frictional and inertial problems of such linkages are totally eliminated.

Ferromagnetic fluids are known in the art and consist of a colloidal suspension of submicron size ferromagnetic particles suspended in a dielectric fluid. Such fluids behave as fluids in all instances; however, when subjected to a magnetic field, the gross behavior of the fluid is changed without changing the fluid characteristics per se. Such fluids, therefore, are responsive to magnetic fields while maintaining all other characteristics as a fluid. A description of such fluids is found in an article entitle "Magnetic Fluids" by R. E. Rosensweig, published in International Science and Technology, July 1966, at pages 48 through 56.

DETAILED DESCRIPTION OF THE INVENTION

Figure 1:
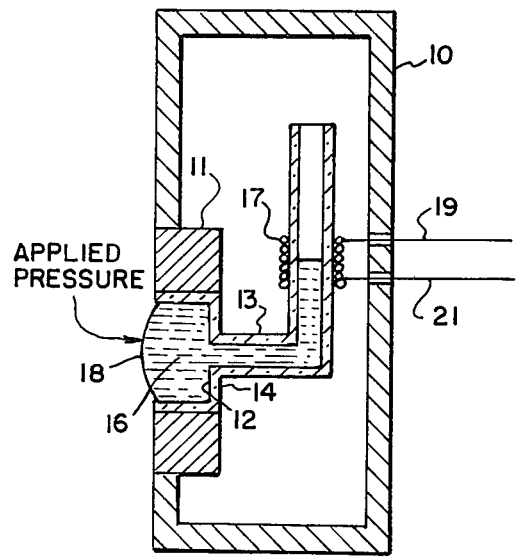
FIG. 1 is a first preferred embodiment of the invention.

The preferred embodiment of the invention shown in FIG. 1 includes an Enclosure 10 which is fabricated from a nonmagnetic material such as aluminum, glas, or a dielectric plastic. In some applications it may be preferable to fabricate Enclosure 10 from a material, such as soft iron to shield Ring Magnet 11 from the environment. In such instances, Magnet 11 can be totally enclosed within Enclosure 10. The Enclosure 10 is closed to offer support and protection against damage to the elements of the inventive sensor. Supported within Casing 10 is a Ring Magnet 11 having a centered circular Aperture 12.

Physically supported within Aperture 12 is Dielectric Container 13 in the form of a right angle tube; in some instances, it may be desirable to utilize a capillary for the Tube 13. Communicating with Tube 13 is an enlarged dielectric Container 14 which is centered within Aperture 12 of Magnetic 11. The Container formed by Elements 13 and 14 contains a ferromagnetic fluid 16; such fluids are colloidal suspensions of ferromagnetic particles in a suitable dielectric carrier. The Fluid 16 is prevented from spilling out of the container by the magnetic field of Ring Magnet 11. Although it is not essential, if desired, a fine nonmagnetic film or screen can be used to support the magnetic fluid within the magnetic field of Magnet 11.

The magnetic fluid can come in direct contact with the fluid, the pressure of which is being measured if the two fluids are insoluable to one another. In instances where the magnetic fluid and pressure exerting fluid interact, it is necessary to insolate them with a membrane composed of a material which does not interact with either of the fluids. If such a membrane is used, it will be a nonmagnetic membrane and preferably would be either a dielectric material or a thin metal membrane so that hysteresis problems ordinarily associated wit metal diaphragms would be eliminated.

Associated with Tube or Capillary 13 is a Coil 17. Coil 17 is located at the highest level within Tube 13 that the ferromagnetic Fluid 16 assumes under normal conditions. Accordingly, changes in pressure against the Face 18 of Fluid 16 cause changes in the level of the fluid within the tube, thereby changing the permeability of the Coil 17. These changes in permeability because of the displacement of Fluid 16 within the coil result in an output signal across Lines 19 and 21 of Coil 17. These signals can be ued in a number of ways to be representative of the pressure applied to the Face 18 of the Fluid 16. Accordingly, such devices as induction bridges, differential transformers, and resistive bridges can be used to detect the output signal on Lines 19 and 21 and yield a voltage signal representative of the pressure acting on Face 18.

In operation, changes in the pressure applied against Face 18 of the ferromagnetic Fluid 16 cause the fluid to be physically displaced within Tube 13, thereby changing the permeability of Coil 17. Accordingly, the level of Fluid 16 within Tube 13 is directly proportional to applied pressure and the output signal on Lines 19 and 21 is also directly proportional to the applied pressure. If Tube 13 is a right cylinder, the displacement of Fluid 16 within the cylinder will be linear and the permeability changes of Coil 17 will be nonlinear so that changes in the voltage across Lines 19 and 21 will be nonlinear.

This can be offset by conically configuring Tube 13 so that fluid displacement within Tube 13 is nonlinear and permeability changes become linear. The exact configuration will, therefore, be dependent upon the characteristics of Coil 17 and are within the purview of those skilled in the art. Therefore, simply by calibrating the signal across the Lines 19 and 21 to the applied pressure, a direct reading representative of the applied pressure is obtained.

Figure 2:
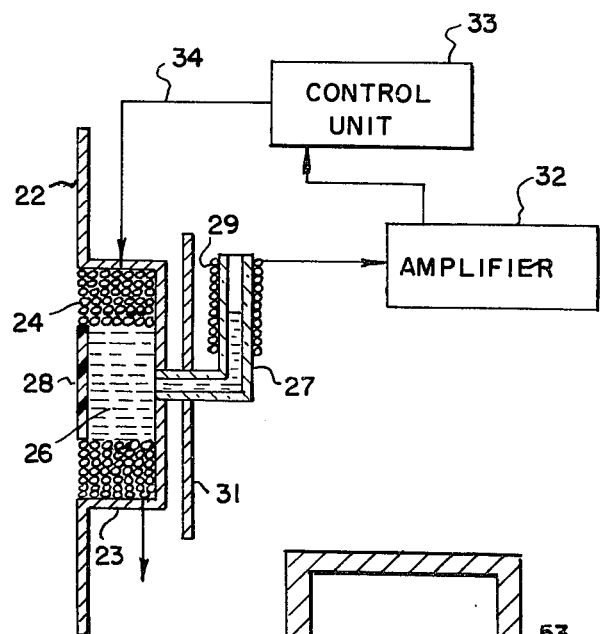
FIG. 2 is a second preferred embodiment of the invention.

Another preferred embodiment of the invention is disclosed in FIG. 2. This embodiment is shown as including a Plate 22 including an Aperture 23 into which an Electromagnetic Coil 24 is inserted. Thus, the embodiment of FIG. 2 can be utilized simply by inserting the Plate 22 into an aperture provided within the container which supports the fluid, the pressure of which is to be measured. The other components of the sensor, therefore, are readily assessable because the sensor is not enclosed as is that of FIG. 1. However, if desired, obviously the entire pressure sensor can be enclosed as is FIG. 1. Or the FIG. 1 embodiment can be used in substantially the same way as that of FIG. 2, so that the Enclosure 10 of the FIG. 1 embodiment is not essential. It will be understood by those skilled in the art that the tube or capillary containing the magnetic fluid must be isolated from the pressure being measured.

The magnetic Fluid 26 is contained within the opening formed in Toroid 24. Fluid 26 also extends into the Capillary 27 so that displacement of the Diaphragm 28 occasioned by pressure change applied thereto causes motion of the fluid within the Capillary 27, thereby changing the induction of Coil 29.

The magnetic strength of Toroid 24 is dependent upon the voltage applied thereto. It, therefore, is preferable to isolate Toroid 24 and Coil 29. Interference between the magnetic field formed by the Ring Coil 24 and Coil 29 is prevented by utilization of a Magnetic Shield 31, which is interposed the two coils. It should be noted with reference to FIG. 1 that is desired, the Permanent Magnet 11 can be shielded from the Coil 17. A Diaphragm 28 is made of a thin, nonmagnetic material, such as a dielectric or thin metal, so that hysteresis losses and other disadvantages occasioned by heavy metallic diaphragms are eliminated. The signal produced in Coil 29 by displacement of Fluid 26 within Capillary 27 is used to control Electromagnet 24 which envelops the magnetic fluid. This is accomplished by applying the signal from Coil 29 to an Amplifier 32, the output of which is applied to an Electromagnet Control Unit 33. Control Unit 33 applies a voltage to Coil 24 to control the magnetic field strength of the coil.

Accordingly, as the magnetic field strength changes, the fluid force on Diaphragm 28 changes in like manner, and the diaphragm is restored to its original position. These changes result in changes in the position of Magnetic Fluid 26 and Coil 29 so that the signal applied to the Amplifier 32 is changed. Accordingly, the only change within the system resulting from pressure changes against Diaphragm 28 occurs in signal applied to Coil 24 by Control Unit 33 over the Line 34. Therefore, the signal available on Line 34 can be monitored and used as an indicator of the pressure being applied to the face of Diaphragm 28. Again, the nonlinearity of the signal can be offset by properly configuring Tube 27.

Figure 3:
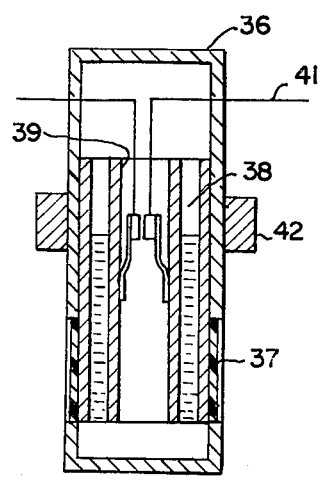
FIG. 3 is a third preferred embodiment of the invention.

Because Electromagnetic Coil 24 must have a voltage applied in order to render it magnetic and thereby creating a magnetic field across the Fluid 26, Control Unit 33 will contain a DC voltage source which will initiate the magnetic action of the system. The signal applied to Control Unit 33 from Amplifier 32 changes the energizing voltage to Coil 24 so that this voltage changes proportionately to the pressure applied to Diaphragm 28. Accordingly, Control Unit 33 will also contain a voltage adding network such as resistive network and other means known to those skilled in the art to control the signal applied to the Coil 24 over Line 34. diaphragm The preferred embodiment disclosed in FIG. 3 includes a Casing 36 which has a circular cross section. An annular flexible nonmagnetic Membrane 37 is disposed within Casing 36 in an appropriate aperture provided in the casing. Diaphragm 37 is backed by a magnetic Fluid 38 which is contained within a thin annular nonmagnetic Container 39. The Container 39 preferably is composed of two thin walls spaced to form an annular capillary. Magnetic Fluid 38 is contained within the capillary. Pressure changes applied to Diaphragm 37 cause displacement of Fluid 38 in the Annular Cylinder 39. Casing 36 is coaxially disposed within a permanent Ring Magnet 42 so that the magnetic field of Magnet 42 is symmetrical about Casing 36 and Magnetic Fluid 38. A Switch 41 is disposed along the axis of symmetry of Magnet 30 and Casing 34.

As changes in the pressure applied to Diaphragm 37 occur, the diaphragm deflects, thereby displacing magnetic Fluid 38 within the capillary. The displacement of the fluid in the vicinity of Switch 41 completes the magnetic circuit formed by Casing 36 and Magnet 42 causing the actuation of Switch 41. Casing 36 can be made from either a magnetic or nonmagnetic material depending upon the desired performance of the magnetic circuit of which it forms a part. It should be noted that Switch 41 can be a reed switch, a Hall effect microswitch, or other type of switch.

It will be appreciated that the invention can also be used as a liquid level sensor. The pressure exerted by a liquid is dependent upon the depth of the liquid. Accordingly, the pressure exerted at a particular depth within a fluid varies in direct proportion to the level of fluid above the particular depth. Thus, by placing a pressure sensor of the inventive type at a known depth the output of the sensor will be an indication of the liquid level variations occurring above the sensor. The invention therefore can be used as a fuel meter associated with the fuel tank of an automobile or truck. By attaching the sensor to the bottom of the fuel tank a "Full" indication will be received when the tank is full. Also, by appropriately calibrating visual readout an "Empty" indication will be received when the fuel reaches a preselected lower level, preferably this level is chosen such that some fuel remains to provide an opportunity to replenish the supply.

Figure 4:
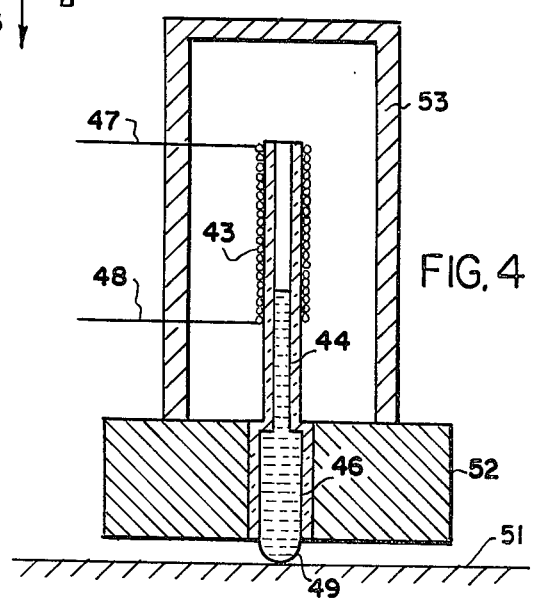
FIG. 4 is a fourth preferred embodiment of the invention.

The preferred embodiment shown in FIG. 4 includes a Hollow Casing 53 supported by a Magnet 52. The Magnet 52 can either be a permanent magnet or a properly energized electromagnet and preferably is a ring in configuration. An Aperture 46 within Magnet 52 supports a ferromagnetic fluid a portion of which extends into a Capillary 44 which extends into Casing 53. A coil 43 surrounds a portion of Capillary 44 so that the highest level of magnetic fluid coincides with Coil 43. Output signals generated within the Coil 43 by a movement of the ferromagnetic are received on output Leads 47 and 48.

The magnetic fluid extends beyond Magnet 52 in a rounded, or bubble-like Portion 49. Because of the magnetic characteristics of the magnetic fluid and the magnetic field of Magnet 52 the ferromagnetic fluid is retained in Aperture 46 and maintains the configuration resulting in the Protrusion 49 extending beyond Magnet 52. Displacement of the Protrusion 49 will cause the ferromagnetic fluid to move with respect to Coil 43 thereby generating output signals indicative of the motion of Protrusion 49. Accordingly changes in the position of Element 51 which Protrusion 49 contacts are indicated by signals on Output Leads 47 and 48 of Coil 43.

The inventive embodiment illustrated in FIG. 4 can be employed in several applications. For example if the Element 51 is a flexible container, such as a tire or inner tube, and the sensor is fixedly positioned with respect to Element 51, pressure changes within Element 51 can be readily detected because such changes will cause the Element 51 to either expand or contract resulting in the displacement of the ferromagnetic fluid with respect to Coil 43. Alternatively Element 51 can be a rigid element such as a shaft. In this environment rotation of the shaft enables variations in the shaft radius to be detected because of the physical displacement of the ferromagnetic fluid caused by the variations. The sensor can also be used to measure flatness of a flat surface simply by moving the surface past the permanently positioned sensor and noting the changes in the displacement of the ferromagnetic fluid. The embodiment disclosed in FIG. 4 therefore is useful both as a pressure sensor and a displacement sensor.

In all embodiments described herein, temperatures can be eliminated by utilizing two identical devices, one of which does not experience the measured pressure. The outputs from the two devices would be applied to a comparator circuit so that changes in the output of the comparator network would be dependent upon the changes in the pressure rather than any temperature effects. Also, if desired, temperature compensation can be utilized by making use of a material having a temperature dependent permeativity or an expansion volume.

I claim:
1. A fluid pressure sensor comprising:
    means for retaining a ferromagnetic fluid in the proximity of the pressure to be sensed, said ferromagnetic fluid being physicaly displaced in response to changes in said pressure to be sensed;
    means for sensing said displacement, said means for sensing being responsive to the magnetic characteristics of said ferromagnetic fluid to provide an output representative of said displacement;
    said means for retaining including a capillary, said ferromagnetic fluid extending into said capillary so that the level of said fluid within said capillary changes in response to changes in the pressure being sensed; and
    said means for sensing includes a coil positioned in the proximity of said level so that changes in said level change the permeability of said coil to produce a signal proportional to said displacement.
2. The sensor of claim 1 wherein said capillary is configured so that fluid level changes within said capillary are nonlinear and said permeability changes are linear.
3. A fluid pressure sensor comprising:
    means for retaining a ferromagnetic fluid in the proximity of the pressure to be sensed, said ferromagnetic fluid being physically displaced in response to changes in said pressure to be sensed;
    means for sensing said displacement, said means for sensing being responsive to the magnetic characteristics of said ferromagnetic fluid to provide an output representative of said displacement; and
    a ring magnet, said ferromagnetic fluid being located within said ring magnet and being magnetically held by said ring magnet.
4. The sensor of claim 3 wherein said means for retaining includes a capillary, said ferromagnetic fluid extending into said capillary so that the level of said fluid changes in response to changes in the pressure being sensed; and
    said means for sensing includes a coil positioned in the proximity of said level so that changes in said level change the permeability of said coil to produce a signal proportional to said displacement.
5. The sensor of claim 4 further including a deformable nonmagnetic diaphragm separating said magnetic fluid and the fluid exerting said pressure to be sensed.
6. The sensor of claim 4 wherein said capillary is configured so that fluid level changes within said capillary are nonlinear and said permeability changes are linear.
7. A fluid pressure sensor comprising:
    means for retaining a ferromagnetic fluid in the proximity of the pressure to be sensed, said ferromagnetic fluid being physically displaced in response to changes in said pressure to be sensed, said means for retaining being a magnet having an aperture, said ferromagnetic fluid being held in said aperture and having a protrusion extending past said magnet, so that said protrusion responds to the motion of an element in contact therewith;
    means for sensing said displacement, said means for sensing being responsive to the magnetic characteristics of said ferromagnetic fluid to provide an output representative of said displacement.

* * * * *

UNITED STATES PATENT OFFICE
CERTIFICATE OF CORRECTION

Patent No. 3,956,938          Dated May 18, 1976

Inventor(s) John Paul Carrico

It is certified that error appears in the above-identified patent and that said Letters Patent are hereby corrected as shown below:

Col. 2, line 7, delete "glas" and insert ---glass---.

Col. 2, line 35, delete "insolate" and insert--insulate---.

Col. 2, line 41, delete "wit" and insert ---with---.

Col. 4, line 10, delete "diaphragm".

Col. 5, line 48, delete "physicaly" and insert ---physically---.

Signed and Sealed this

Thirtieth Day of November 1976

[SEAL]

Attest:

RUTH C. MASON
*Attesting Officer*

C. MARSHALL DANN
*Commissioner of Patents and Trademarks*